L. L. NORTHUP & T. CORSCADEN.
SHUTTER-FASTENER.
No. 179,665. Patented July 11, 1876.
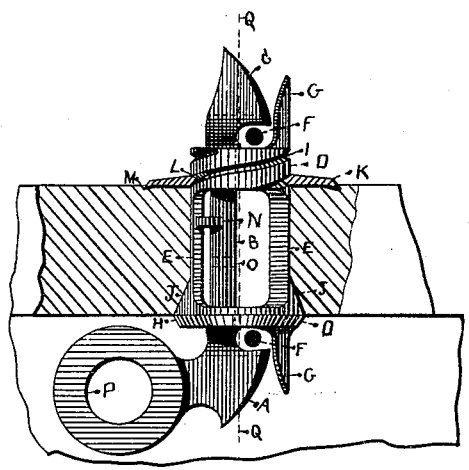
FIG. 1.
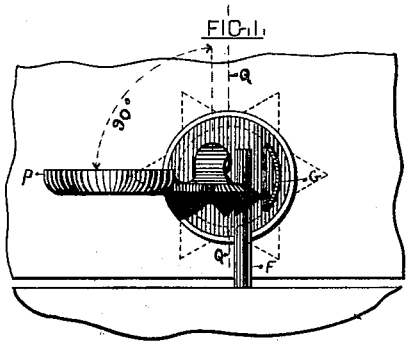
FIG. 2.
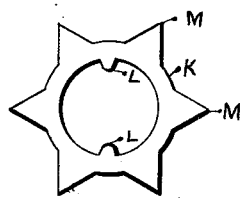      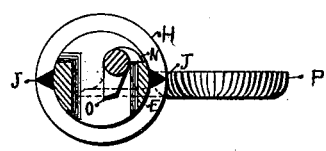
FIG. 3.   FIG. 4.   FIG. 5.
WITNESSES  
George S. Northup  
Jas. O. Beebe
INVENTORS  
Louis L. Northup  
Thomas Corscaden

UNITED STATES PATENT OFFICE.

LOUIS L. NORTHUP, OF JOHNSTON, AND THOMAS CORSCADEN, OF PROVIDENCE, RHODE ISLAND.

IMPROVEMENT IN SHUTTER-FASTENERS.

Specification forming part of Letters Patent No. 179,665, dated July 11, 1876; application filed December 18, 1875.

*To all whom it may concern:*

Be it known that we, LOUIS L. NORTHUP, of Johnston, in the county of Providence and State of Rhode Island, and THOMAS CORSCADEN, of Providence, in said county and State, have invented certain Improvements in Shutter-Fasteners, of which the following is a specification:

The object of our invention is to produce a shutter-fastener combining the following advantages: First, a frame or bearing which can be made to form perfectly-fitting bearings for a rotating catch at no other cost than that of casting said frame or bearing upon said rotating catch; second, an improved method of securing said frame or bearing, so that it cannot turn or work out of its true position in the shutter; and, third, reliable means to check the rotation of said catch, so that it will operate effectually for the purpose designed; and our invention consists in a novel construction and arrangement of parts whereby these ends are attained, as will be hereinafter more fully described, and definitely claimed.

Figure 1 of the accompanying drawing is a plan view, Fig. 2 an end view, Figs. 3 and 4 detached views, and Fig. 5 a cross-sectional view, of a shutter-fastener embodying our invention.

This shutter-fastener is composed of the rotating catch A B C, inclosed by the frame or bearing D D E E, and the collar K, and is constructed substantially as follows: The rotating catch, consisting of the hooks A and C, cylindrical spindle B, and handle P, is cast in a single piece, after which the frame or bearing, consisting of the cylindrical ends D D, united by the bars E E, is cast in a single piece upon the spindle B of the rotating catch, (by the usual means well known to those skilled in the art,) so that the ends D D encircle the spindle B, and form bearings so perfectly fitted that the rotating catch freely revolves without such looseness as to cause unpleasant noise by rattling in the frame or bearing when in use. The provision of the collar K, of some malleable or ductile metal, completes the manufacture of the shutter-fastener. The rotating catch A B C has upon the spindle B the projections N and O. The frame or bearing D D E E is provided upon one end with a flange, H, and projections J J upon the opposite end with the spiral grooves I, and upon both ends with the tips G G. The collar K has upon its inner edge the projections L L, and upon its outer edge the points M M.

A hole being bored in the lower rail of a shutter or window-blind, and the collar K being removed from the shutter-fastener, the fastener is inserted in the hole with the flange H on the inner side, and the spirally-grooved end projecting through on the other side. The collar K is slipped thereon, and turned around, and, by means of the projections L L engaging with the spiral grooves I, draws itself and the flange H tightly against the two sides of the shutter or blind, and holds the fastener securely therein. The projections J J impinge in the wood, and keep the fastener from turning out of position, and one or more of the points M being bent into the wood, the collar K is prevented from turning off. When the shutter or blind is closed, the beveled edge of the hook A strikes against the post F in the window-sill, and throws the rotating catch A B C around, so that the post F is received inside and between the tip G and hook A, and the rotating catch, being impelled by its own weight, immediately returns to its normal position, (as fixed by the stop or projection N which rests against the bar E,) and incloses the post F, which cannot be released without lifting on the handle P. Any danger of the rotating catch being thrown around so far as to cease to operate by its own weight is prevented by the projection O striking against the bar E. When the blind is opened the hooks C acts, as described, upon the post in the side of the building.

We do not claim the rotating catch A B C, with its handle P, as our invention, being aware that it is the subject of Letters Patent No. 146,028, granted to H. A. Skinner, under date of December 30, 1873, in which it is claimed with or without a case or barrel, &c. Our frame or bearing D D E E, however, differs from the one described by Skinner, in being cast whole, instead of being cast in two longitudinal sections, and fastened together by a small screw and rivet.

What we, therefore, claim as new and of our invention, and desire to secure by Letters Patent, is—

1. The frame or bearing D D E E, with or without its tips G G, when such frame or bearing is cast in a single piece, with its cylindrical ends D D encircling and forming bearings for the cylindrical spindle B of the rotating catch A B C, substantially as shown, and for the purpose described.

2. The frame or bearing D D E E, provided on one end with the flange H and projections J J, and on the opposite end with the spiral grooves I, in combination with the collar K, said collar having upon its inner edge the projections L L engaging with the spiral grooves I, and having its outer edge formed into points M, substantially as shown, and for the purpose set forth.

3. The stops N and O on the spindle B, substantially as shown, and for the purpose set forth.

LOUIS L. NORTHUP.
THOS. CORSCADEN.

Witnesses:
L. O. ROCKWOOD,
H. H. SALISBERRY.